United States Patent
Jackson et al.

(10) Patent No.: US 9,394,063 B2
(45) Date of Patent: Jul. 19, 2016

(54) METHODS UTILIZING COLD SPRAY TECHNIQUES FOR REPAIRING AND PROTECTING ROTARY COMPONENTS OF AVIATION PROPULSION SYSTEMS

(71) Applicant: Bell Helicopter Textron Inc., Fort Worth, TX (US)

(72) Inventors: Kenneth Myron Jackson, Euless, TX (US); Walter West Riley, Richardson, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 404 days.

(21) Appl. No.: 13/840,396

(22) Filed: Mar. 15, 2013

(65) Prior Publication Data

US 2014/0263853 A1     Sep. 18, 2014

(51) Int. Cl.
*B64F 5/00* (2006.01)
*B64C 27/00* (2006.01)
*B32B 15/01* (2006.01)
(Continued)

(52) U.S. Cl.
CPC ............ *B64F 5/0081* (2013.01); *B32B 15/011* (2013.01); *B32B 15/013* (2013.01); *B64C 27/006* (2013.01); *B64D 33/00* (2013.01); *C23C 24/04* (2013.01); *B64D 2045/009* (2013.01); *F05D 2230/31* (2013.01); *Y10T 29/49318* (2015.01); *Y10T 29/49746* (2015.01); *Y10T 428/12063* (2015.01)

(58) Field of Classification Search
CPC ... B64F 5/0081; B32B 15/011; B32B 15/013; B64C 27/006; B64D 33/00; B64D 2045/009; C23C 24/04; F05D 2230/31; Y10T 29/49318; Y10T 29/49746; Y10T 428/12063
See application file for complete search history.

(56) References Cited

U.S. PATENT DOCUMENTS

| 5,129,253 A | 7/1992 | Austin et al. |
| 2005/0084657 A1* | 4/2005 | Ohara ........................ 428/195.1 |

(Continued)

FOREIGN PATENT DOCUMENTS

| DE | 102005015881 A1 | 10/2006 |
| EP | 2256228 A2 | 12/2010 |

(Continued)

OTHER PUBLICATIONS

Machine Translation of WO2009/065385; Banhirl; May 28, 2009.*

(Continued)

*Primary Examiner* — Ryan J Walters
(74) *Attorney, Agent, or Firm* — Fish & Richardson P.C.

(57) ABSTRACT

A method of repairing a component comprises identifying a non-compliant surface of the component, wherein the non-compliant surface is not within an allowable tolerance, cold spraying a powder comprising a metal onto the non-compliant surface, and forming a coating comprising the metal over the non-compliant surface, wherein an outer surface of the coating is within an allowable tolerance. In an embodiment, the method of repairing an outer component further comprises machining the outer surface of the coating. In an embodiment, the component is a shaft, a rotor mast, an input quill, or a bearing. In an embodiment, the component contains electronic equipment during the cold spraying, and wherein the cold spraying does not damage the electronic equipment. In an embodiment, the component is repaired without subjecting the component to a hydrogen embrittlement bake.

16 Claims, 9 Drawing Sheets

(51) Int. Cl.
*C23C 24/04* (2006.01)
*B64D 33/00* (2006.01)
*B64D 45/00* (2006.01)

(56) References Cited

U.S. PATENT DOCUMENTS

2008/0286108 A1 11/2008 Lui et al.
2012/0272523 A1 11/2012 Calla et al.
2013/0177437 A1* 7/2013 Amancherla et al. ..... 416/241 R

FOREIGN PATENT DOCUMENTS

WO 2007027177 3/2007
WO 2009065385 A1 5/2009

OTHER PUBLICATIONS

Communication pursuant to Article 94(3) EPC in EP Application No. 13171570.8 issued on Feb. 20, 2014, 5 pages.
Communication pursuant to Article 94(3) EPC in EP Application No. 13171570.8 issued on Jul. 7, 2014, 4 pages.
Communication Pursuant to Article 94(3) EPC issued in European Application No. 13171570.8 on Nov. 28, 2014; 4 pages.
Champagne, et al., "Repair of Apache Mast Support on AH64 Helicopter Using Cold Spray," Failure Prevention for System Availability—Proceedings of the 62nd Meeting of the Society for Machinery Failure Prevention Technology, Apr. 6-8, 2008, pp. 217-229, XP917550.
Ghelichi, et al., "Coating by the Cold Spray Process: A State of the Art," Frattura Ed., Integrita Strutturale, vol. 8, Apr. 2009, pp. 30-44, XP055096918.
Foreign communication from a counterpart application, European application No. 13171570.8, Supplementary European Search Report, dated Jan. 27, 2014, 4 pages.
Barrie, "Can a Cold, Green, Supersonic Spray Save the Black Hawk," Fox News, www.foxnews.com/tech/2013/01/03-can-cold-green-supersonic-spray-save-black-hawk, downloaded from the Internet Feb. 22, 2013, published Jan. 3, 2013, 4 pages.
Leyman, et al., "Cold Spray Process Development for the Reclamation of the Apache Helicopter Mast Support," Army Research Laboratory, ARL-TR-4922, Aug. 2009, 32 pages.
Communication under Rule 71(3) EPC issued in European Application No. 13171570.8 on Nov. 5, 2015; 40 pages.

* cited by examiner

METHODS UTILIZING COLD SPRAY TECHNIQUES FOR REPAIRING AND PROTECTING ROTARY COMPONENTS OF AVIATION PROPULSION SYSTEMS

CROSS-REFERENCE TO RELATED APPLICATION

Not applicable.

STATEMENT REGARDING FEDERALLY SPONSORED RESEARCH OR DEVELOPMENT

Not applicable.

BACKGROUND

Rotor masts for rotorcraft such as helicopters must often conform to strict tolerance requirements. As a result of fabrication errors or accidents during manufacturing, assembly, maintenance, or transport, a mast's bearing journal may become damaged and unsuitable for use. As an example, during installation of a mast into a rotorcraft, the bearing journal must make a tight precision fit and the surface of the journal may become scratched during insertion. The journal surface may also become damaged during operation, as a result of fretting, for example. In some applications and for some designs, available repair techniques are not considered adequate to restore a damaged bearing journal of a rotor mast to operating condition, and protocol often calls for a damaged mast to be discarded entirely. Therefore, it would be desirable to provide improved methods of repairing surfaces of rotorcraft masts and other precision rotary components of aviation and aerospace propulsion systems.

In some instances, bearing journals of rotorcraft gears and shafts are repaired by electrodeposition followed by a post plate bake. Copper plate or thin copper plate layered over sulfamated nickel plate is deposited onto a damaged or worn surface of a bearing journal using electrodes. During electrodeposition, a process known as hydrogen embrittlement may occur wherein hydrogen atoms dissolve into the metal matrix of the mast causing excessive internal stresses. Because the internal stresses may later induce cracking, the post plate hydrogen embrittlement bake of the mast or gear is required to remove the dissolved hydrogen. However, post plate hydrogen embrittlement bakes can have a detrimental outcome for some mast designs and mast applications. For example, some rotorcraft masts contain electronics that may be destroyed by the high temperatures of a post plate hydrogen embrittlement bake. Especially in rotor designs where the electronics cannot be replaced without compromising the integrity of the rotor mast, this situation often requires the mast to be replaced entirely. Thus, a need exists for new methods of repairing helicopter masts wherein hydrogen embrittlement may be avoided.

SUMMARY

In some embodiments of the disclosure, a method of repairing a component is provided that comprises identifying a non-compliant surface of the component, wherein the non-compliant surface is not within an allowable tolerance, cold spraying a powder comprising a metal onto the non-compliant surface, and forming a coating comprising the metal over the non-compliant surface, wherein an outer surface of the coating is within an allowable dimensional range. In an embodiment, the method of repairing an outer component further comprises machining the outer surface of the coating. In an embodiment, the component is a shaft, a rotor mast, an input quill, or a bearing. In an embodiment, the component contains electronic equipment during the cold spraying, and wherein the cold spraying does not damage the electronic equipment. In an embodiment, the component is repaired without subjecting the component to a hydrogen embrittlement bake.

In other embodiments, a method of protecting a component is provided that comprises cold spraying a powder comprising a metal onto a surface of the component, and forming a coating comprising the metal on the surface of the component. In an embodiment, the component is a rotor mast. In an embodiment, the coating comprises an anti-corrosion coating. In an embodiment, the coating comprises chrome, stainless steel, or combinations thereof.

In yet other embodiments, an apparatus is provided that comprises a component that was previously out of an allowable dimensional range, but that has been brought into an allowable dimensional range by cold spraying a powder comprising a metal onto a non-compliant portion of the component.

DETAILED DESCRIPTION

It should be understood at the outset that although an illustrative implementation of one or more embodiments are provided below, disclosed systems and methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, it may be desirable to repair or restore a rotary component of an aviation propulsion system such as a rotor mast or an input pinion having undersized dimensions by cold spraying a powder comprising metal onto a surface defining an outer boundary of the undersized dimensions. In some cases, it may be desirable to protect the rotor mast of a rotorcraft by covering a surface of the rotor mast with a protective or corrosion-resistant layer applied to the surface by cold spraying a powder comprising metal onto the surface of the rotor mast. In some embodiments, the lower temperatures and localized heat of the cold spraying process allows electronics contained with the rotary component to remain functional and thus reusable when the rotary component is installed or reinstalled into the aviation propulsion system.

Various embodiments of the methods described herein may be suitable for repairing, protecting, or repairing and protecting the rotor masts, input pinions, and other high precision rotary components of various types of aircraft and rotorcraft. Various embodiments of the methods described herein may be suitable for repairing, protecting, or repairing and protecting the rotary components of rotorcraft such as helicopters, tiltrotor aircraft, turboprops, and the like, both manned and unmanned. Various embodiments of the disclosure may be suitable for repairing, protecting, or repairing and protecting rotor masts and input quills of helicopters.

Figure 1:
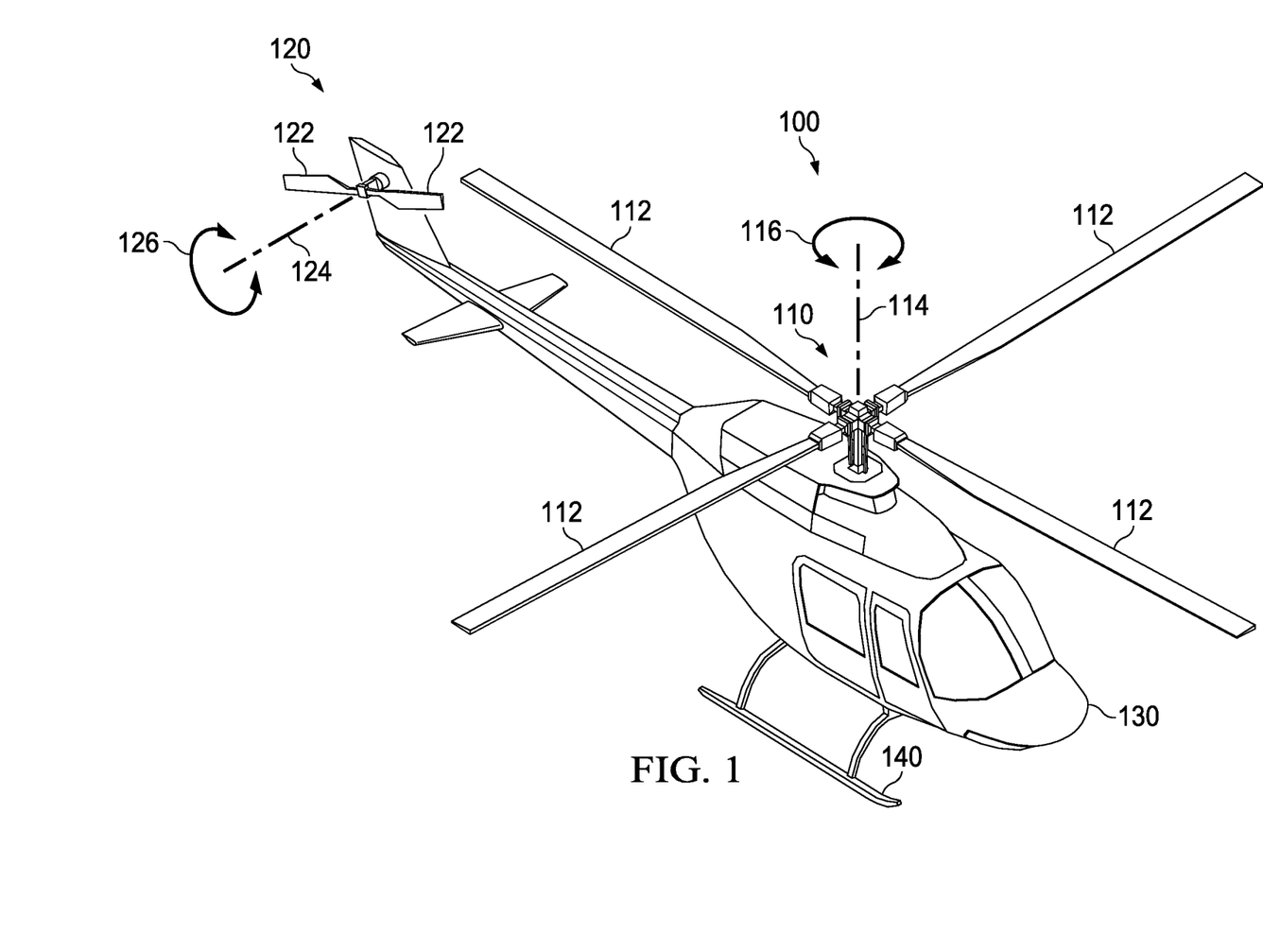
FIG. 1 is a perspective view of a helicopter according to an embodiment of the disclosure.

Referring to FIG. 1, a perspective view of a helicopter 100 is shown. It should be understood that the helicopter example is given merely for illustration purposes only. Embodiments of the present disclosure are not limited to any particular setting or application, and embodiments may be suitable for the rotary components of other aircraft, vehicles, or equipment.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag. Main rotor assembly 110 can also be used to induce pitch and roll of helicopter 100.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the yaw of helicopter 100.

Fuselage 130 is the main body section of helicopter 100. Landing gear 140 is attached to fuselage 130 and supports helicopter 100 on the ground. Fuselage 130 optionally holds the crew, passengers, and/or cargo and houses the transmission, engine, gearboxes, drive shafts, control systems, etc. that are needed to establish an operable helicopter. Rotor assemblies 110, 120 are coupled to a transmission housed within fuselage 130. Transmission includes an input quill. End of input quill is coupled to the rotor assemblies 110, 120 through one or more gears, and directly to engine at the other end. Engine drives rotation of input quill and the rotation of input quill drives rotation of rotor assemblies 110, 120.

Figure 2A:
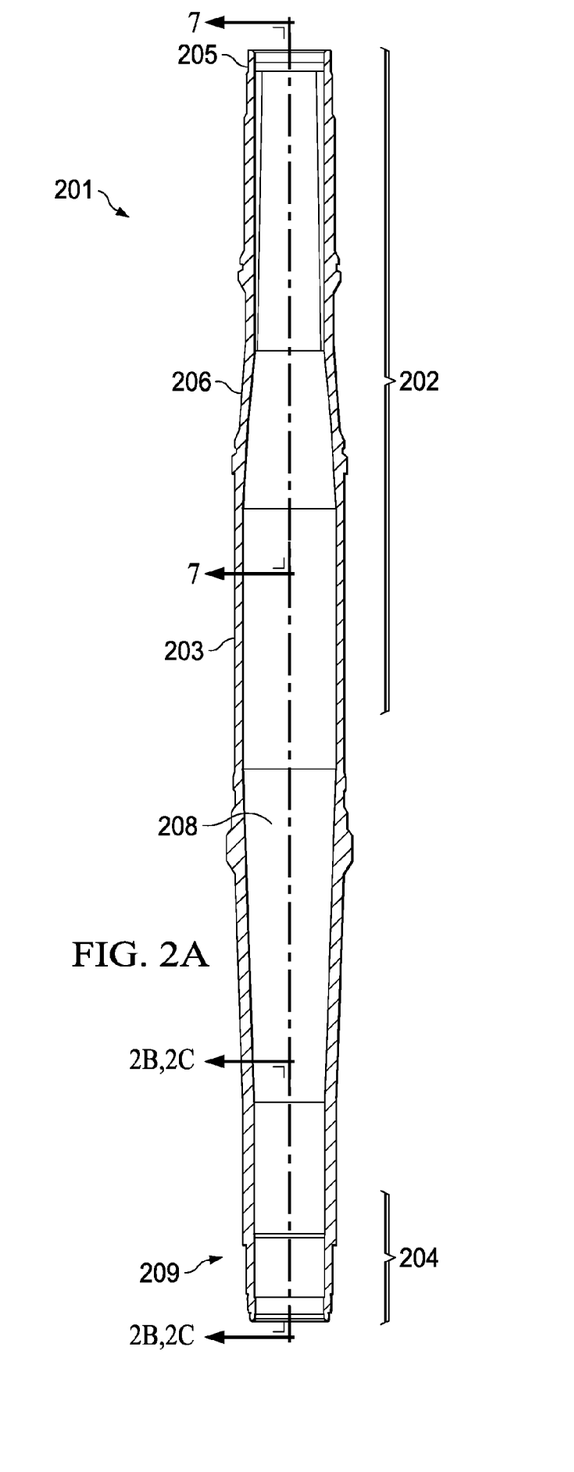
FIG. 2A is a longitudinal cross-sectional view of a rotor mast of a rotorcraft.

Various embodiments of the disclosure may be suitable for repairing, protecting, or a combination thereof the rotor masts of rotorcraft such as helicopters, tiltrotor aircraft, airplanes, and the like. Referring to FIG. 2A, a longitudinal cross-sectional view of an exemplary rotor mast 201 of a main rotor assembly of a helicopter is shown. Rotor mast 201 generally comprises an elongated tubular structure having an external wall 203 made of steel, such as 4340 steel, 9310 low-alloy steel, or nitriding steel such as nitralloy steel. A top portion 202 of rotor mast 201 may have protrusions and/or end fittings 205 that allow the mast to be connected to a rotor hub. Top portion 202 may also include at least one outer circumferential surface 206 that is not enclosed within a fuselage 130 during operation of the helicopter, but is instead exposed to an outside environment. Bottom portion 204 of rotor mast 201 includes a bearing journal 209. Bearing journal 209 facilitates free rotation of the rotor mast 201 around rotational axis 208 and cooperates with a stationary bearing to limit undesirable movement of rotor mast 201 relative to the fuselage. In some embodiments, the bearing journal 209 may be a tapered bearing journal. In some embodiments, the bearing journal may be a cylindrical roller journal.

Figure 2B:
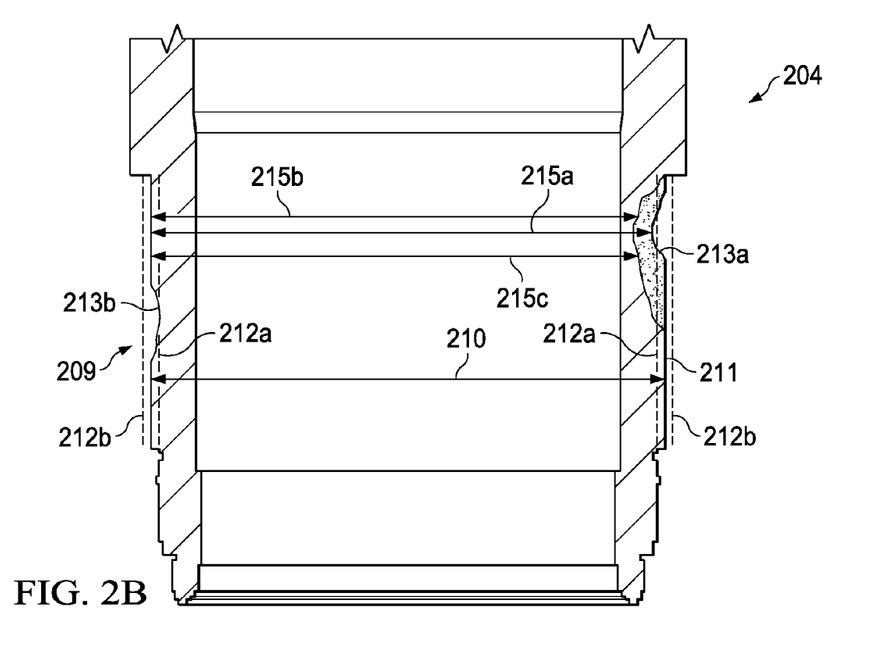
FIG. 2B is a longitudinal cross-sectional view of a damaged bottom portion of a rotor mast of a rotorcraft.

Over the lifetime of a rotor mast, the rotor mast bearing may become damaged by, for example, surface wear, fretting, fabrication error, accidents involving the rotor mast occurring during transport, assembly, disassembly, or repair of the rotor mast, any plurality thereof, or any combination thereof. Because mechanical failure of a rotor mast is highly likely to result in catastrophic damage to the helicopter and loss of life of the passengers therein, rotor mast designs often set forth exacting dimension and tolerance requirements. Thus, when damage or wear compromises the dimensional precision of a rotor mast, protocol often dictates repair of the rotor mast, or replacement if repair is not feasible. Referring to FIG. 2B, a longitudinal cross-sectional view of the bottom portion of rotor mast 201 is shown. Damage to bearing journal 209 is represented by the presence of one or more damage surfaces 213a, 213b along an outer circumferential surface 211. Dashed lines 212a, 212b represent the minimum and maximum allowable dimensional ranges specified for the outer diameter 210 of outer circumferential surface 211 of bearing journal 209. Diameters 215a, 215b, 215c represent undersized dimensions because each of diameters 215a, 215b, 215c terminates at an endpoint below dashed lines 212a. Damage surfaces 213a, 213b define an outer boundary of a plurality of undersized dimensions 215a, 215b, 215c of bearing journal 209. Damage surfaces are one kind of non-compliant surface. As used herein, the term "non-compliant surface" refers to a surface of a component that comprises the endpoints of a plurality of dimensions that are outside allowable dimensional ranges (e.g., undersized dimensions 215a, 215b, 215c), that is out of tolerances prescribed by a design specification of the component, or a combination thereof. Thus, damage surfaces 213a and 213b may be referred to as non-compliant surfaces 213a and 213b.

Figure 2C:
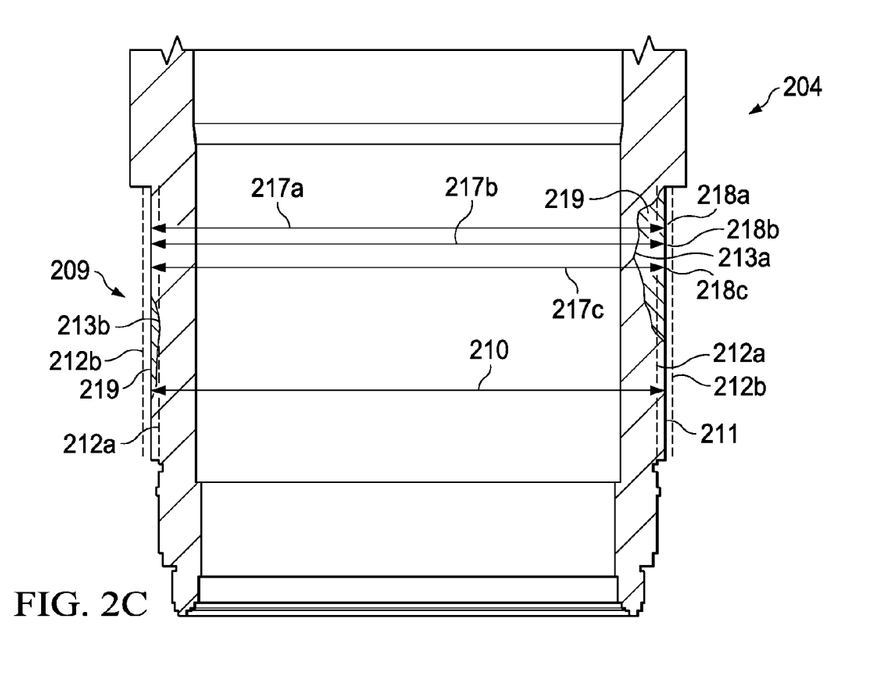
FIG. 2C is a longitudinal cross-sectional view of a bottom portion of a rotor mast of a rotorcraft repaired according to an embodiment of the disclosure.

In accordance with various embodiments of the disclosure, a repair may be made wherein all or substantially all of the undersized dimensions 215a, 215b, 215c may be extended to lengths falling within the maximum and minimum tolerance limits represented by dashed lines 212a, 212b by the addition of material administered through a cold spray process. Referring to FIG. 2C, a longitudinal cross-sectional view of a bottom portion of a rotor mast 201, repaired in accordance with an embodiment of the disclosure, is shown. By covering non-compliant surfaces 213a, 213b with a cold sprayed powder comprising metal in accordance with one or more embodiments of the disclosure, a coating 219 may be formed. As the coating builds, the undersized outer dimensions 215a, 215b, 215c shown in FIG. 2B lengthen into diameters 217a, 217b, 217c, having endpoints 218a, 218b, 218c that fall within the maximum and minimum allowable dimensions 212a, 212b prescribed by the design specification of the rotor mast 201. In instances where the coating extends beyond maximum allowable dimensions 212a, 212b, the coating may be machined to provide diameters 217a, 217b, 217c, having endpoints 218a, 218b, 218c.

Figure 3A:
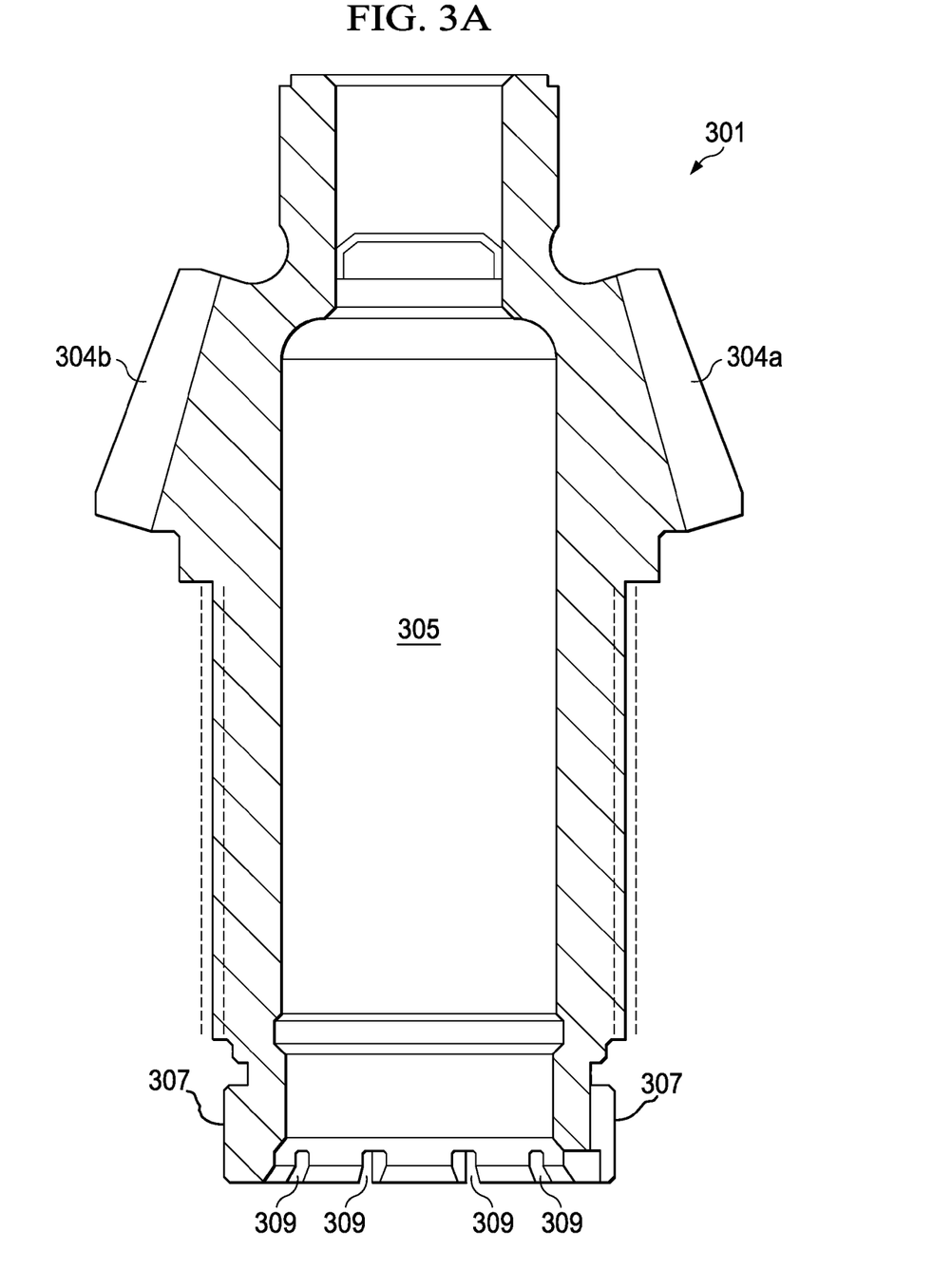
FIG. 3A is a longitudinal cross-sectional view of an input quill of an aircraft engine.

Various methods of the disclosure may be suitable for repairing, protecting, or a combination thereof input pinions of aircraft engines. For example, various embodiments of the disclosure may be suitable for the repair of an input quill of a helicopter. Referring to FIG. 3A, a longitudinal cross-sectional view of a helicopter input quill 301 is shown. Input quill 301 comprises bevel gears 304a, 304b for engaging a rotor mast of the helicopter. Input quill 301 also comprises a hollowed out portion 305, splines 307 for engaging the helicopter engine, and notches 309 for engaging a nut lock spring that facilitates maintaining proper preload of the bearing.

Figure 3B:
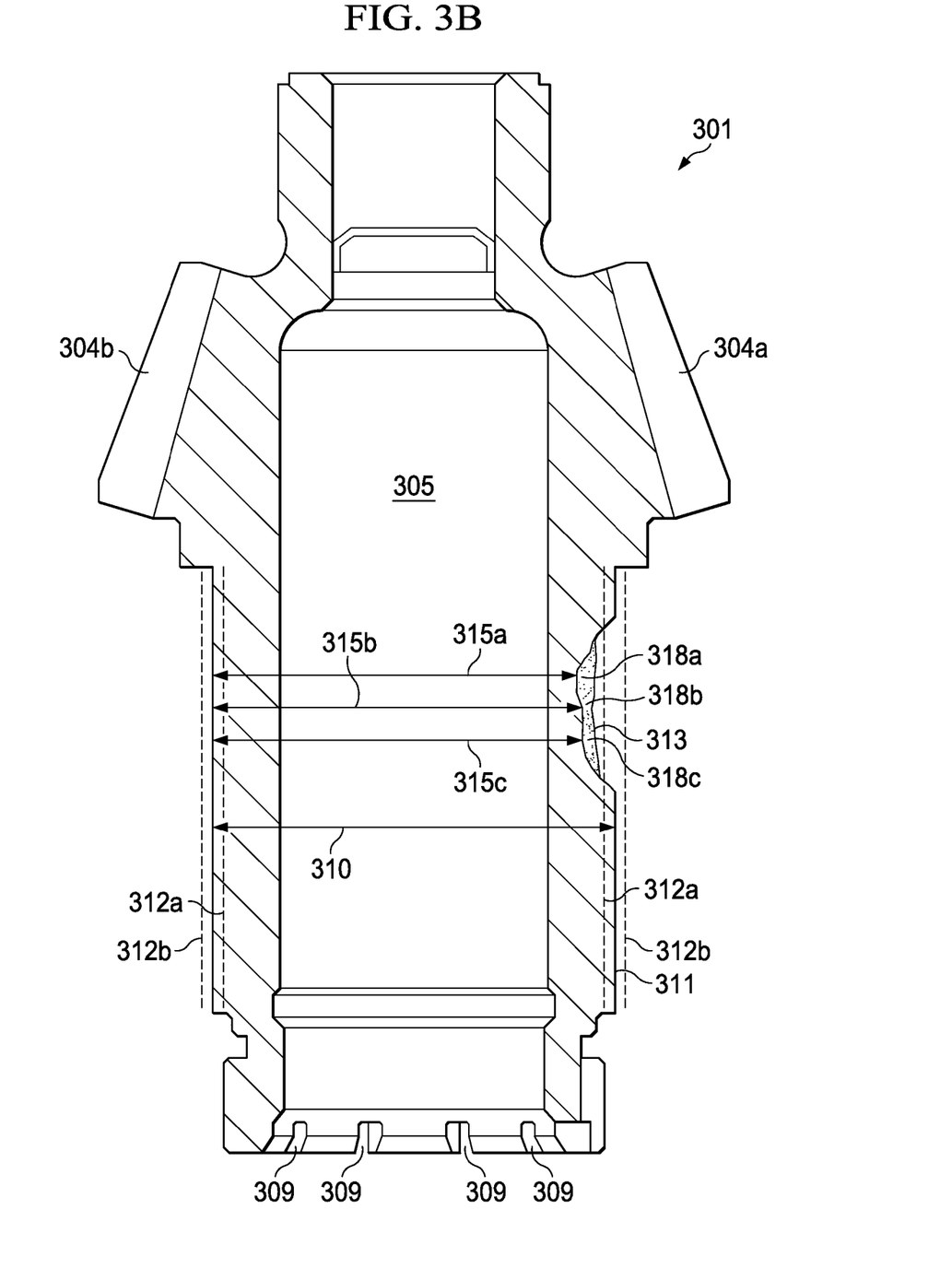
FIG. 3B is a longitudinal cross-sectional view of a damaged bottom portion of an input quill of an aircraft engine.

When damage or wear compromises the dimensional precision of an input pinion bearing journal, such as an input quill of a helicopter, protocol often dictates repair of the input quill, or replacement if repair is not feasible. Referring to FIG. 3B, a longitudinal cross-sectional view of an input quill 301 is shown. Damage to input quill 301 is represented by the presence of one or more non-compliant surfaces, such as non-compliant surface 313, along an outer circumferential surface 311. Dashed lines 312a, 312b represent the minimum and maximum tolerance limits specified for the outer design diameter 310 of outer circumferential surface 311 of input quill 301. Diameters 315a, 315b, 315c represent undersized dimensions because each of diameters 315a, 315b, 315c terminates at an endpoint below dashed lines 312a. Non-compliant surface 313 defines an outer boundary of a plurality of undersized dimensions 315a, 315b, 315c of input quill 301.

Figure 3C:
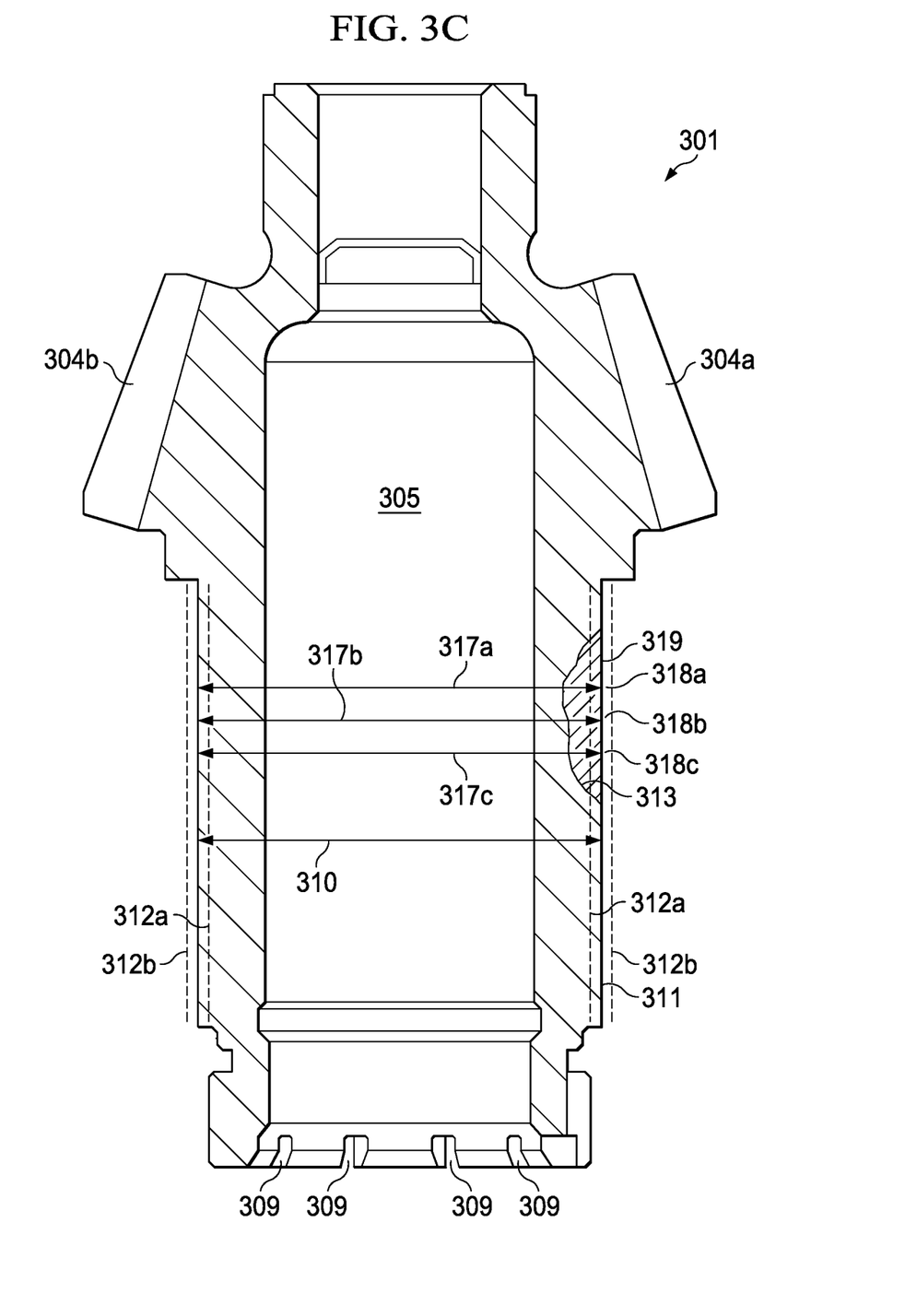
FIG. 3C is a longitudinal cross-sectional view of an input quill of an aircraft engine repaired according to an embodiment of the disclosure.

In accordance with various embodiments of the disclosure, a repair may be made wherein all or substantially all of the undersized dimensions 315a, 315b, 315c may be extended to lengths falling within the maximum and minimum tolerance limits represented by dashed lines 312a, 312b by the addition of material administered through a cold spray process. Referring to FIG. 3C, a longitudinal cross-sectional view of an input quill 301, repaired in accordance with an embodiment of the disclosure, is shown. By covering non-compliant surfaces 313 with a cold sprayed powder comprising metal in accordance with one or more embodiments of the disclosure, a coating 319 may be formed. As the coating builds, the undersized outer dimensions 315a, 315b, 315c shown in FIG. 3B lengthen into diameters 317a, 317b, 317c, having endpoints 318a, 318b, 318c that fall within the maximum and minimum allowable dimensions 312a, 312b prescribed by the design specification of input quill 301 design. In instances where the coating extends beyond maximum allowable dimensions 312a, 312b, the coating may be machined to provide diameters 317a, 317b, 317c, having endpoints 318a, 318b, 318c.

Figure 4:
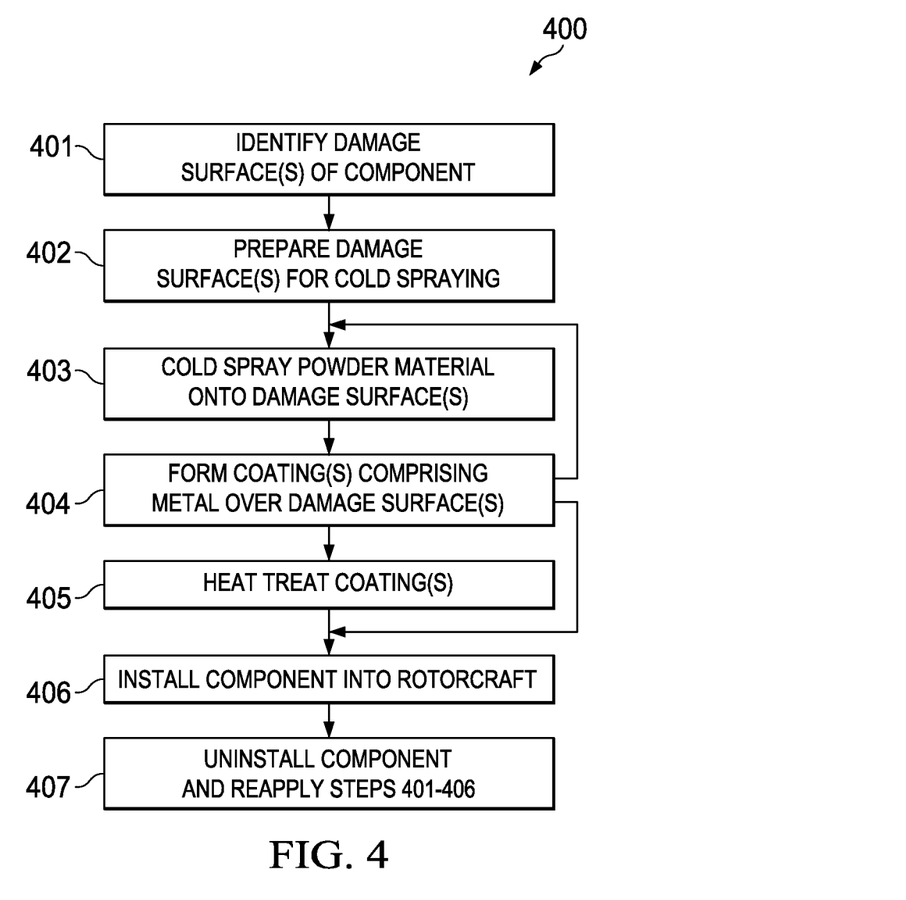
FIG. 4 is a flow diagram of a method according to an embodiment of the disclosure.

Referring to FIG. 4, a flow diagram of a method 400 of repairing a component in accordance with an embodiment of the disclosure is shown. The component may be a rotary component of an aircraft propulsion system, as described above. In explaining method 400, the following description refers to the rotor mast shown of FIGS. 2A-2C and the input quill of FIGS. 3A-3C. References to the rotor mast of FIGS. 2A-2C and the input quill of FIGS. 3A-3C are made for the purposes of illustration only, and are not intended to imply limitations of method 400 or any of the other methods embodied in the disclosure. For example, methods according to various embodiments of the disclosure, including method 400, may be applied to other designs of rotor masts and input pinions and to types of rotary components different from those shown in FIGS. 2A-2C and 3A-3C. Similarly, various methods of the disclosure may be applied to different surfaces of component, and are not restricted to, for example, the outer circumferential surface of a rotor mast bearing journal or an outer circumferential surface on the central portion of an input quill.

The method 400 may begin at block 401 wherein one or more non-compliant surfaces of the rotary component are identified. As mentioned above, the term "non-compliant surface" refers to a surface of a component that comprises the endpoints of a plurality of dimensions that are outside allowable dimensional ranges, that is out of tolerances prescribed by a design specification of the component, or a combination thereof.

Non-compliant surfaces defining an outer boundary of a plurality of undersized dimensions of the rotary component may be identified by measuring individual dimensions of the rotary component and determining whether the measured values fall within the tolerance limitations of a design specification of the rotary component. Measurements may be made using any devices or techniques suitable for measuring the dimensions of aviation engine components, rotorcraft rotor components, or a combination thereof. Suitable measuring devices may include, for example, digital or mechanical calipers.

The method 400 may progress to block 402 wherein the one or more preparation treatments are applied to one or more of the non-compliant surfaces before cold spraying. Preparation treatments may include, but are not limited to, cleaning, machining, masking off, or any combination thereof one or more of the non-compliant surfaces of the rotary component before cold spraying the one or more non-compliant surfaces.

In various embodiments, the non-compliant surfaces may be cleaned before cold spraying in order to remove surface contamination. Surface contamination may include oxide layers formed between the material of the non-compliant surface and the surrounding environment as well as foreign matter such as organic particulates and non-combustible substances. The surface contamination may comprise substances that are incompatible with the cold spray bonded system; that may alter over time the properties of the deposited repair material, the properties of original material surrounding the repaired surface, or a combination or a combination thereof; that may compromise the bond formed between the non-compliant surface and the deposited repair material; or any combination thereof.

Cleaning may comprise, for example, high-pressure spray washing of one or more non-compliant surfaces of the rotary component using one or more polar solvents, nonpolar solvents, any plurality thereof, or any combination thereof. For example, surface contamination may be removed by applying a high-pressure water spray to one or more non-compliant surfaces of the rotary component. Although not wishing to be bound by theory, it is believed that the water spray cleans the surface by dissolving substances having a polar character, through the mechanical action of the high-pressure spray, and through convection. As another example, the non-compliant surfaces of a component may be cleaned by applying a high-pressure toluene spray. Although not wishing to be bound by theory, it is believed that the toluene spray cleans by dissolving nonpolar substances, through the mechanical action of the high-pressure spray, and through convection. In some embodiments, an acidic solution may be used to clean the non-compliant surfaces. In some embodiments, a basic solution may be used to clean the non-compliant surfaces. In some embodiments, one or more abrasive materials selected from the commercially available abrasives described below may be used to clean the surface. In some embodiments, an oxidative cleaning agent may be applied to the surface of one or more non-compliant surfaces to remove surface contamination. In some embodiments, a cleaning solution is applied at elevated temperatures. In some embodiments, one or more soft abrasives may be used to clean the non-compliant surfaces without substantially altering the surface properties of the rotary component.

In various embodiments, the one or more non-compliant surfaces may be prepared for cold spraying by machining the one or more non-compliant surfaces. Machining may include any suitable operations for removing material from a work surfaces. The machining may include, for example, the application of one or more surface finishing processes. Suitable surface finishing processes may include, but are not limited to, abrasive blasting, grinding, polishing, superfinishing, or any combination thereof. In some embodiments, machining may be employed to remove an oxide coating from one or more of the non-compliant coatings to provide a stronger bond between the one or more non-compliant surfaces and the powdered repair material of the cold spray process.

In some embodiments, the one or more non-compliant surfaces are machined to texturize the surface to be cold sprayed. Although not wishing to be bound by theory, it is believed that texturizing the surface allows for greater mechanical interlocking between the cold sprayed particulates and the non-compliant surface when the cold sprayed particulates impact the one or more non-compliant surfaces at high speeds. Texturizing may be achieved, for example, by first grinding away surface discontinuities of the non-compliant surfaces to provide a uniform surface and then vapor blasting the surface to provide surface texture. As another example, texturizing may be achieved by vapor blasting the non-compliant surfaces. In an embodiment, cleaning and texturizing may be accomplished by applying a degreasing solvent (e.g. PD680) to the non-compliant surfaces and then vapor blasting the non-compliant surfaces. The vapor blasting may advantageously clean and texturize the non-compliant surfaces in a single step.

In an embodiment, one or more commercially available abrasives may be used to machine the non-compliant surfaces of a component. Suitable abrasives may include but are not limited to free abrasive particulates, coated abrasives, bonded abrasives, abrasive wheels, abrasive slurries, such as a chemical mechanical polishing (CMP) slurry, superabrasives, and the like. In an embodiment, abrasive blasting of a non-compliant surface may be achieved using free abrasive particulates. In another exemplary embodiment, grinding of a non-compliant surface of a component is achieved using an abrasive wheel mounted on a grinder. In yet another exemplary embodiment, surface finishing of a non-compliant surface of a component may be achieved using a CMP slurry.

In various embodiments, one or more non-compliant surfaces of a component may be prepared for cold spraying by masking off one or more portions of the non-compliant surfaces from the undamaged surfaces before cold spraying. Masking may prevent powdered repair materials from accumulating on the undamaged surfaces, thus allowing deposition of the powdered repair material to be restricted to the intended surfaces. In an embodiment, at least one of the non-compliant surfaces of the rotary component is masked off with an industrial-quality masking material capable of withstanding (i.e. not prematurely disintegrating) the elevated temperatures of the cold sprayed powdered repair materials. In an embodiment, the masking material comprises a thermally insulating masking material. As described in greater detail below, masking may advantageously facilitate greater localization of heat transferred to the rotary component during repair of the one or more non-compliant surfaces.

In preparing the rotary component for cold spraying, the preparation treatments selected, the number of times each preparation treatments is carried out, and the order of carrying out the preparation treatments may be varied to achieve one or more desired results, to optimize the condition of the non-compliant surfaces for a particular cold spray bonded system, or a combination thereof. For example, one or more of the surface cleaning treatments may be cleaned separately with high-pressure sprays of polar and nonpolar solution, grinded with an abrasive wheel to remove an undesirable oxide coating, and isolated from the undamaged surfaces with masking material.

The method 400 may progress to block 403, wherein a powder material comprising metal may be cold sprayed onto each of the one or more non-compliant surfaces of the rotary component. Cold spraying the one or more non-compliant surfaces of the rotary component may comprise cold spraying a powdered repair material over each of the one or more non-compliant surfaces using a cold spray system, a cold spray apparatus, or a combination thereof.

The method 400 may progress to block 404 wherein a coating comprising metal forms over one or more non-compliant surfaces of the rotary component. More particularly, a coating comprising one or more metals may be formed over each of the one or more non-compliant surfaces such that an outer surface of each coating defines an outer boundary extending all or substantially all of the undersized dimensions to lengths falling within design tolerances of the rotary component. Cold spraying may be continued for a length of time sufficient to eliminate all or substantially all of the undersized dimensions.

Formation of the one or more coatings may be facilitated by machining surfaces of the cold sprayed coatings. The machining may be carried out in accordance with the techniques (e.g., abrasive blasting, grinding, polishing, superfinishing, and combinations thereof) and/or with the materials discussed above in connection with block 402. In various embodiments, surface finishing may be applied to remove portions of the coating having thicknesses exceeding the upper tolerance limits of a component design. In various embodiments, surface finishing may be applied to provide the coated surface with a uniform texture, to provide texture uniformity between coated and uncoated surfaces, or a combination thereof. Machining, by abrasive blasting, grinding, polishing, superfinishing, and combinations thereof, may also be utilized to achieve a more uniform profile of the non-compliant surface, to achieve dimensional precision greater than the dimensional precision required by the tolerance limits, to achieve a particular texture, or a combination thereof.

In some instances, the cold sprayed coatings may be over-machined resulting in a new plurality of undersized dimensions. In these cases, the cold spraying step of block 403 may be repeated, followed by additional machining if necessary. Blocks 403 and 404 may be iteratively repeated as necessary, until the desired surface coatings are achieved, or both.

In some cases, the method 400 may progress to block 405 wherein at least one of the coatings undergoes heat treatment. In an embodiment, the heat treatment comprises annealing the deposited material comprising the coatings over the non-compliant surfaces (e.g., deposited material 219 covering non-compliant surfaces 213a, 213b). An annealing heat treatment may stress relieve the deposited material, achieving a desired microstructure (such as the microstructure of the original material of the rotary component), or a combination thereof.

When annealing more than one coating, the coatings may be annealed at the same or different times and under the same or different annealing conditions. Although selection of an optimal annealing temperature may depend on the materials forming the cold spray bond at the non-compliant surface, annealing may generally be conducted in a temperature range of from about 260° C. (500° F.) to about 760° C. (1400° F.).

In some embodiments, the heat treatment comprises localized Hot Isostatic Pressing (HIP) of one or more of the coatings. HIP may reduce porosity of the coating material, improve mechanical properties of the coating, or a combination thereof.

In an embodiment, one or more of the non-compliant surfaces may be prepared for one or more heat treatments by masking off one or more portions of the non-compliant surfaces from the undamaged surfaces before applying the one or more heat treatments. Masking may be carried out in accordance with the techniques, materials, or a combination thereof discussed in connection with block 402. In an embodiment, masking material used in the cold spraying step may be removed and new masking material applied. In another embodiment, masking material used during the cold spraying is re-used during one or more heat treatments by selecting a material capable of withstanding the conditions of the cold spraying and the one or more heat treatments.

Subsequent to the heat treatment, an outer surface of one or more of the coatings may optionally be subjected to machining operations such as abrasive blasting, grinding, polishing, superfinishing, and combinations thereof to achieve one or more of the objectives discussed in connection with block 404. Machining may also be appropriate in instances where the one or more dimensions of the rotary component become oversized as a result of thermal expansion or other thermodynamically induced microstructural changes occurring within the deposited repair material, the original material of the rotary component, or a combination thereof during the repair process. The oversized dimensions may be machined down to within tolerance limits of the rotary component design.

The method 400 may progress to block 406 wherein the rotary component is installed into a rotorcraft. In an embodiment, one or more of steps 401-405 are applied to a rotary component containing electronic equipment. In an embodiment, one or more of steps 401-404 are applied to a rotary component containing electronic equipment without also conducting a post hydrogen embrittlement bake. In an embodiment, the repair process is carried out utilizing one or more of the methods disclosed above for localizing application of the heat to the non-compliant surfaces. By avoiding a post hydrogen embrittlement bake, by utilizing one or more of the techniques for localizing heat during the repair treatment, or a combination thereof, a rotary mast containing electronic equipment may advantageously be repaired without damaging the electronic equipment, without having to replace the electronic equipment, and without having to transport the rotary component to the manufacturer.

In some cases, method 400 may progress to block 407 wherein component of an aviation propulsion system having been previously repaired in accordance with an embodiment of the disclosure is removed from operation (i.e., disassembly) and repaired again in accordance with an embodiment of the disclosure (e.g., by applying one or more of steps of blocks 401-406). In an embodiment, a rotary component of an aviation propulsion system may be repaired using the cold spraying methods described herein to repair the rotary component a plurality of times.

In various embodiments, repair of a rotary component does not require all of the steps disclosed in connection with FIG. 4. Nor are the embodiments of the disclosure limited to conducting the steps of FIG. 4 in the order presented. Also, steps of blocks 401-407 are not limited to a single iteration. In various embodiments, the selection, order, and repetition of steps may be varied to achieve a desired result.

Figure 5:
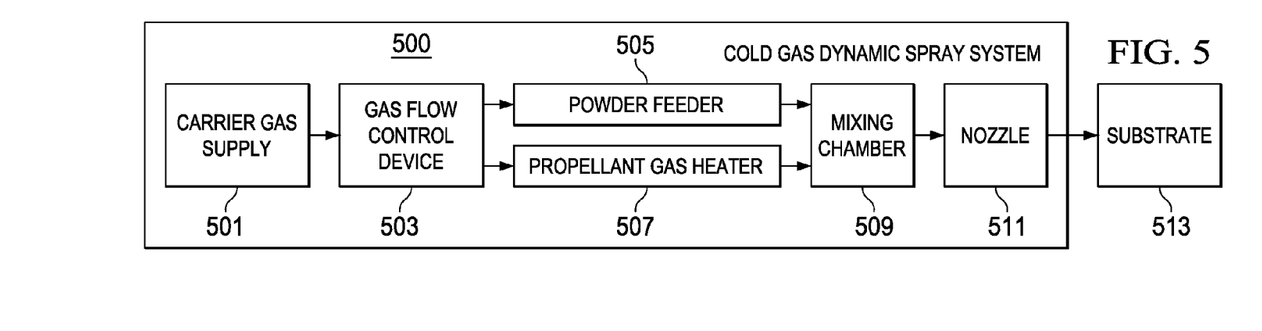
FIG. 5 is a block diagram of an exemplary cold spraying system according to an embodiment of the disclosure.

Referring to FIG. 5, a block diagram of an exemplary gas dynamic cold spraying system 500 according to an embodiment of the disclosure is shown. The gas dynamic cold spraying system 500 generally comprises a powder feeder 505 for providing a powdered repair material, a carrier gas supply 501, a gas flow control device 503, a propellant gas heater 507 for heating and accelerating (i.e. propelling) particles of the powdered repair material, a mixing chamber 509 and a nozzle 511. In general, the gas dynamic cold spraying system 500 transports the powdered repair material with a suitable pressurized gas to the mixing chamber for 509. Pressurized carrier gas, such as air, helium, nitrogen, and mixtures thereof, enters gas flow control device 503 from carrier gas supply 501, which splits the carrier gas between powder feeder 505 and propellant gas heater 507. Particles of the powdered repair material are accelerated by the pressurized carrier gas through nozzle 511, which may be a specially designed nozzle such as a de Laval nozzle. The accelerated gas exits nozzle 511 towards a target substrate 513. In some embodiments, the substrate 513 comprises one or more non-compliant surfaces of a rotary component of an aircraft propulsion system. In other embodiments, the substrate 513 comprises a surface of a rotary component of an aircraft propulsion system to be protected by forming a corrosion-resistant coating, a coating with enhanced mechanical properties, or a combination thereof on the surface. When the particles strike the target surface, converted kinetic energy of the particles cause plastic deformation in the target metallic substrate (the non-compliant surfaces of the rotary component), which permits the particles to partially embed into the surface. Thus, the gas dynamic cold spraying system 500 can bond the powdered repair material to the non-compliant surfaces of the rotary component, thereby forming coatings over the non-compliant surfaces, as discussed in more detail in connection with block 404.

The gas dynamic cold spraying process is referred to as a "cold spray" process because the particles are applied at a temperature that is well below their melting point. Rather than by the particle temperature, it is the kinetic energy of the particles, on impact with the target surface, which causes the substrate to plastically deform and bond the particles with the target surface.

A variety of different systems and implementations can be used to perform the gas dynamic cold spraying. For example, U.S. Pat. No. 5,302,414, entitled "Gas-Dynamic Spraying Method for Applying a Coating" describes an apparatus designed to accelerate materials and to mix particles of the materials with a process gas to provide the particles with a density of mass flow between about 0.05 grams per second per centimeter square (g/s·cm$^2$) and about 17 g/s·cm$^2$. Supersonic velocity is imparted to the gas flow, with the jet formed at high density and low temperature using a predetermined profile. The resulting gas and powder mixture is introduced into the supersonic jet to impart sufficient acceleration to ensure a particle velocity ranging between 300 and 1200 meters per second (m/s).

Figure 6:
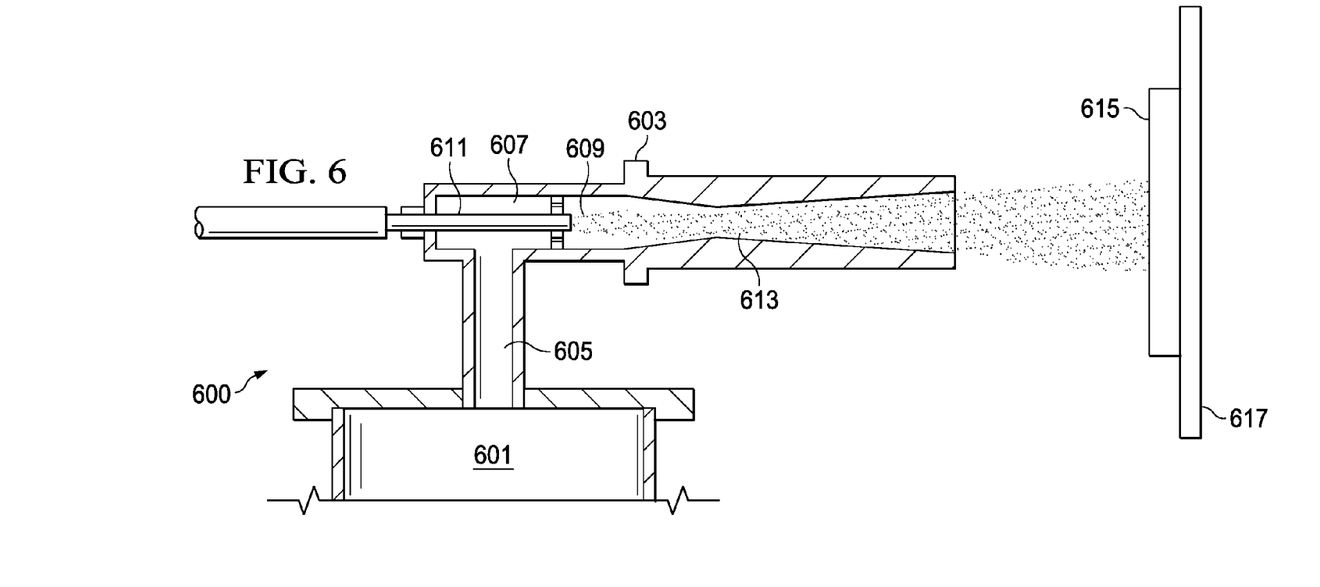
FIG. 6 is an oblique side view of a cold spray apparatus according to an embodiment of the disclosure.

Referring to FIG. 6, a cold spraying apparatus in accordance with an embodiment of the disclosure is shown. The cold spraying apparatus 600 generally comprises a nozzle 603 that is communicatively coupled to a propellant gas heater 601 by way of a main gas passage 605. A premix chamber 607 is in line with the main gas passage 605 and upstream of the nozzle 603. The gases are transferred from the premix chamber 607 into a mixing chamber 609 where the gas is combined with the powdered repair material. Particles of the powdered repair material are transferred to the mixing chamber 609 using an injection tube 611 that is in communication with a powder feeder that supplies the particles. The gas dynamic spraying is enabled by using the nozzle 603 that includes a throat 613 or other aperture that is sized to optimize the gas pressure and, in turn, the particle velocity as it passes through the nozzle 603. The particles exit nozzle 603 and are deposited on substrate 617 as layer 615.

The gas flow rate through nozzle 603 may generally be in a range of from about 30 cubic feet per meter (CFM) to about 100 CFM. The powdered repair material may pass through the cold spray apparatus 600 in a range of from about 10 pounds per hour (lbs/hr) to about 30 lbs/hr. The temperature of the gas stream passing through nozzle 603 may range from about 0 degrees Fahrenheit (° F.) to about 1300° F., alternatively 0° F. to about 1000° F., alternatively 700° F. to about 1000° F., alternatively 900° F. to about 1000° F. The gas flow may be maintained at a pressure of from about 5 atmospheres (atm) to about 20 atm and at temperature below the melting point of the powdered repair material. Sizes of the particles of the powdered repair material may range from about 1 micrometer (μm) to about 100 μm in diameter, alternatively from about 1 μm to about 40 μm in diameter.

Velocities of particles of the powder repair material may exit the nozzle 603 at velocities of from about 300 m/s to about 1500 m/s. The gas composition may comprise nitrogen, helium, air, or any combination thereof. Gas compositions comprising air may accelerate particles of the powdered repair material of from about 300 m/s up to about 600 m/s. Gas compositions comprising helium may accelerate particles of the powdered repair material up to velocities of from about 1000 m/s to about 1200 m/s. When the gas composition comprises a mixture of air and helium particles, the powdered repair material may be maintained at velocities in a range of from about 300 m/s to about 1200 m/s.

Powdered repair material suitable for use in various embodiments of this disclosure may include powders comprising metal. The powdered repair material may comprise the same material as the non-compliant surfaces of the rotary component, or a different material. The powdered material may comprise steel. For example, the powdered material may comprise one or more stainless steels, alloy steels, nitriding steels, or any combination thereof. In an embodiment, the powdered repair material comprises stainless steel, such as 440C stainless steel, alloy steel, such as 4340 steel, low-alloy steel, such as 9310 low-alloy steel, nitriding steel, such as nitralloy steel, or any combination thereof.

By employing cold spraying in the repair of rotary components used in aviation propulsion systems, a repair process wherein heat is effectively restricted to the non-compliant surfaces and kept away from one or more untreated portions of the rotary component is provided. By localizing the heat away from temperature sensitive materials in other parts of the rotary component, electronics contained with the rotary component, or a combination thereof may advantageously be protected from temperatures that would otherwise further damage to the rotary component. The temperature of the rotary component during treatment may vary as a function of distance from the regions where heat is supplied and regions of the rotary component more distally located from the surfaces being repaired may enjoy a greater degree of heat shielding than regions located closer. In various embodiments, thermal isolation is enhanced by using thermally insulating masking material to mask off the repair surfaces from the undamaged portions of the rotary component. Thermal isolation may further be facilitated by controlling the application of heat as a function of time. The temperatures of temperature sensitive regions and sub-components of the rotary component may be monitored during the repair process. When the temperature at one or more of these regions approach levels that may damage other parts of the rotary component, the temperature may be lowered again by temporarily reducing or terminating the cold spraying or heat treatments. Thermal isolation may further be enhanced by taking advantage of both the distance-temperature and the time-temperature functional relationships in a single repair treatment. Over the course of treatment, the temperature profile of the rotary component may be monitored and the application of heat fluctuated over time such that sensitive regions and sub-components located further away from the treated portions of the rotary component do not exceed potentially damaging temperature thresholds.

Localization of heat may be particularly advantageous when the component under repair contains electronics. Electronics are sensitive to, and may be destroyed by, elevated temperatures. By restricting the application of heat to the repair regions of the rotary component, temperatures near regions containing the electronics may be maintained low enough to prevent damage to the electronics. As such, various embodiments of the present disclosure may be particularly advantageous in connection with rotary components containing electronics. Previous repair processes have required baking the entire rotary component, which necessitated shipping the rotary component back to the manufacturer or a suitably equipped repair facility to remove the electronics by a specially trained technician using specialized equipment and then heat-treat the entire component in a kiln, an autoclave, or other specialized heat treatment device. Transportation of the rotary component is often difficult, time-consuming, and expensive (e.g., in terms of downtime of the rotorcraft). Transportation also carries the risk of accidents during transport which may inflict additional damage to the rotary component. By localizing application of the heat to the non-compliant surfaces, repair may be made without removing the electronics and without the need for transporting the rotary component to another facility. In circumstances where electronics cannot be removed in order to make a repair to the rotary component, various embodiments of the disclosure are further advantageous in that significant costs can be saved by repairing instead of replacing the rotary component. In some embodiments, cold spraying is employed to repair an outer circumferential surface of a helicopter rotor mast containing a torque sensor, a flexible circuit board, and heat gauges, which may be damaged at temperatures exceeding 160° F. In some embodiments, cold spraying is employed to repair a rotary component containing one or more optical devices, fluid sensing devices, or a combination thereof.

Various embodiments of the disclosure are additionally advantageous in that employing cold spraying to repair rotary component of aviation propulsion systems allows successful repairs to be made without conducting a post hydrogen embrittlement bake. Post hydrogen embrittlement bakes may have a detrimental effect on steels sensitive to post hydrogen embrittlement bakes and may result in the destruction of electronic equipment contained within the rotary component being repaired.

In accordance with various embodiments of the disclosure, a method of protecting a rotor mast of a rotorcraft is also provided. The method may generally comprise cold spraying a powder comprising metal onto a surface of a rotor mast of a rotorcraft, forming a coating comprising a metal on the surface of the rotor mast, and installing the rotor mast into a rotorcraft.

Figure 7:
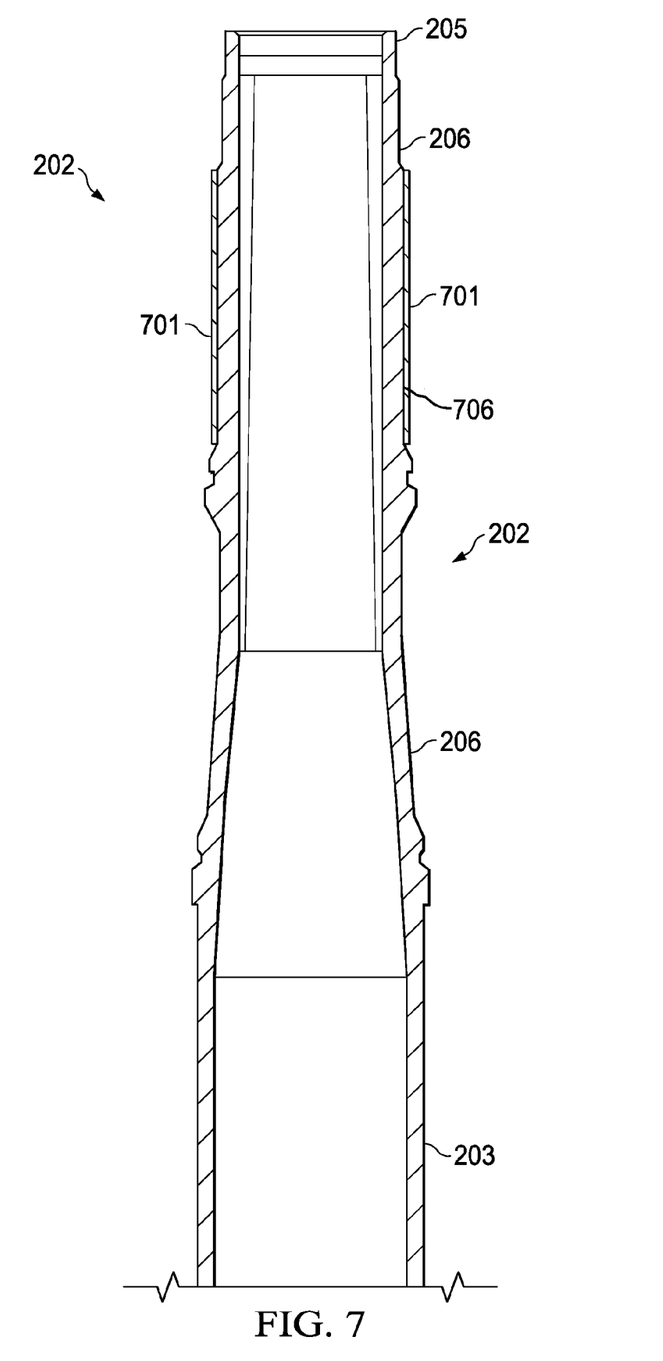
FIG. 7 is a longitudinal cross-sectional view of a top portion of the rotor mast of FIG. 2A comprising a protective coating in accordance with an embodiment of the disclosure.

Referring now to FIG. 7, a previously exposed circumferential surface 706 of the rotor mast 201 of FIG. 2A has been coated with a protective coating 701 administered in accordance with an embodiment of the disclosure. The method of protecting a rotary component of a rotorcraft may utilize one or more of the steps discussed in connection with FIG. 4, except that cold spraying is applied to an undamaged portion of a rotary component, rather than a non-compliant surface, in order to provide corrosion-resistance, enhance mechanical properties, or a combination thereof to the coated region. For example, various embodiments of the method of protecting a rotary component of a rotorcraft may be carried out by utilizing the gas dynamic cold spraying system 500 and apparatus 600 described above. However, the methods of protecting and repairing disclosed herein are not to be considered mutually exclusive. In an embodiment, a damaged rotary component is repaired in accordance with the method disclosed in FIG. 4 and a portion of the repaired portion of the rotary component, an undamaged portion of the rotary component, or a combination thereof is provided with an anti-corrosion coating, a coating providing enhanced mechanical properties, or a combination thereof.

In an embodiment a powder comprising metal is cold sprayed onto a surface of a rotor mast of a rotorcraft, such as a helicopter. Referring again to FIGS. 2 and 7, circumferential surface 206 of helicopter rotor mast 201 and circumferential surface 706, being outside the protective encasement of a rotorcraft fuselage, may experience critical loading while simultaneously being exposed to various kinds of damaging environmental elements, including debris blasts, sand blasts, and chemical corrosion. This combination may cause circumferential surfaces 206 and 706 to undergo dangerous cracking on the surface leading to potentially catastrophic failures.

In an embodiment an anti-corrosion coating, a coating having enhanced mechanical properties, or a combination thereof may be cold sprayed onto a portion of the rotor mast exposed to the environment. The coating may comprise chrome, stainless steel, or a combination thereof. A chrome coating may provide enhanced anti-corrosive and enhanced mechanical properties (e.g., hardness), thus augmenting a usually vulnerable portion of a rotorcraft rotor.

In addition to exposed portions of the rotorcraft, the method of protecting a rotor mast of a rotorcraft may also be applied to other regions of the rotor mast. For example, a protective coating may be applied to a surface of the bearing journal of a rotor mast.

In various embodiments, the method of protecting a rotary component of may be suitable for repairing or protecting a rotor mast of rotorcraft such as helicopters, tiltrotor aircraft, turboprops, and the like.

Various embodiments of the methods of the disclosure may be particularly suited to repairing and protecting high precision rotary components used in aviation propulsion systems. Such components may be subject to tight tolerance requirements, which may, for example, range in magnitude from about $9 \times 10^{-4}$ inches to about $1 \times 10^{-4}$ inches, depending on the particular component. Rotary components may have undersized dimensions subject to one or more design tolerances of, for example, $\pm 1 \times 10^{-4}$ inches, alternatively within $\pm 4 \times 10^{-4}$ inches, and alternatively within $\pm 7 \times 10^{-4}$ inches may be repaired. In some embodiments, helicopter rotor masts having a design tolerance of, for example, $\pm 1.5 \times 10^{-4}$ inches for an outer journal bearing diameter may be repaired. In some embodiments, an input quill of a helicopter having a design tolerance of, for example, $\pm 1.5 \times 10^{-4}$ inches for a diameter may be repaired. In some embodiments, rotary components of aviation propulsion systems having, for example, one or more design tolerances of a magnitude of greater than or equal to about $3 \times 10^{-4}$ inches and less than or equal to about $6 \times 10^{-4}$ inches may be repaired. Various methods for repairing and protecting rotary components according to embodiments of the disclosure may also be used to repair and protect surfaces of integral roller raceways, other gears of rotary aircraft, and other rotary components designed to withstand extreme loads and high rotational velocities.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Detailed Description of the Embodiments is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:
1. A method, comprising:
identifying a non-compliant surface of a component, the component comprising temperature sensitive material and at least one of electronic equipment, optical equip- ment, or fluid sensing devices, wherein the non-compliant surface is not within an allowable tolerance;

cold spraying a powder comprising a metal onto the non-compliant surface, wherein the cold spraying comprises restricting heat to the non-compliant surface and avoiding one or more undamaged portions of the component by masking off one or more portions of the non-compliant surface from the undamaged portions of the component with a thermally insulating masking material, wherein the cold spraying does not damage the electronic equipment, the optical equipment, or the fluid sensing devices;

localizing heat generated by the cold spraying away from the temperature sensitive material; and forming a coating comprising the metal over the non-compliant surface, wherein an outer surface of the coating is within an allowable tolerance.

2. The method of claim 1, wherein the non-compliant surface is not within the allowable tolerance because of surface wear, fretting, fabrication error, an accident during transport, assembly, disassembly, or repair of the component, or any combination thereof.

3. The method of claim 1, wherein the cold spraying comprises spraying a mixture of a gas and the powder comprising the metal at a temperature of less than 1300° F. onto the noncompliant surface.

4. The method of claim 3, wherein the cold spraying further comprises spraying a mixture of a gas and the powder comprising metal at temperatures of less than 1000° F. onto the non-compliant surface.

5. The method of claim 1, wherein the component is repaired without subjecting the component to a hydrogen embrittlement bake.

6. The method of claim 1, wherein the metal comprises stainless steel.

7. The method of claim 1, wherein the metal is substantially the same material as the component.

8. The method of claim 1, wherein the component is a rotor mast.

9. The method of claim 1, wherein the component is an aircraft component.

10. The method of claim 1, further comprising machining the outer surface of the coating.

11. The method of claim 1, wherein the cold spraying comprises substantially limiting application of the cold spray to areas defined by the non-compliant surface.

12. The method of claim 1, wherein a design tolerance of the component is ± about $3 \times 10^{-4}$ inches.

13. A method, comprising:

cold spraying a powder comprising a metal onto an undamaged portion of a component, wherein the cold spraying comprises restricting heat to the undamaged portion and avoiding other portions of the component by masking off the undamaged portion from the other portions of the component with a thermally insulating masking material, the component comprising temperature sensitive material and at least one of electronic equipment, optical equipment, or fluid sensing devices, wherein the cold spraying does not damage the electronic equipment, the optical equipment, or the fluid sensing devices;

localizing heat generated by the cold spraying away from the temperature sensitive material; and forming a coating comprising the metal over the undamaged portion of the component.

14. The method of claim 13, wherein the component is a rotor mast.

15. The method of claim 13, wherein the coating comprises an anti-corrosion coating.

16. The method of claim 13, wherein the coating comprises chrome, stainless steel, or combinations thereof.

* * * * *